United States Patent

[11] 3,539,244

| [72] | Inventor | George E. Marks |
| | | Minneapolis, Minnesota |
| [21] | Appl. No. | 574,372 |
| [22] | Filed | Aug. 23, 1966 |
| [45] | Patented | Nov. 10, 1970 |
| [73] | Assignee | Sperry Rand Corporation |
| | | New York, New York |
| | | a corporation of Delaware |

[54] ELECTROMAGNETIC RADIATION DEFLECTION APPARATUS EMPLOYING ELECTRO-OPTIC OR ELECTRO-ACOUSTICAL DEVICES
2 Claims, 8 Drawing Figs.

[52] U.S. Cl. .................................................. 350/160, 350/161, 350/286
[51] Int. Cl. ..................................................... G02f 1/28
[50] Field of Search............................................ 350/160, 161

[56] References Cited
UNITED STATES PATENTS

| 3,189,746 | 6/1965 | Slobodin et al. .............. | 250/216 |
| 3,367,733 | 2/1968 | Grau ............................ | 350/160 |
| 3,371,978 | 3/1968 | Matovich ...................... | 350/160 |

*Primary Examiner*—Ronald L. Wibert
*Assistant Examiner*—Paul K. Godwin, Jr.
*Attorney*—Thomas J. Nikolai and John P. Dority ABSTRACT: The specification describes apparatus incorporating electro-optic or electro-acoustical devices for deflecting electromagnetic radiation such as light to implement an optical scanner and certain devices for performing Boolean logic.

Patented Nov. 10, 1970 3,539,244

INVENTOR
GEORGE E. MARKS
BY Thomas J. Nikolai
ATTORNEY

Patented Nov. 10, 1970  3,539,244

INVENTOR
GEORGE E. MARKS
BY Thomas J. Nikolai
ATTORNEY

ELECTROMAGNETIC RADIATION DEFLECTION APPARATUS EMPLOYING ELECTRO-OPTIC OR ELECTRO-ACOUSTICAL DEVICES

The present invention relates generally to a device for deflecting electromagnetic radiation and in particular, to light deflection devices. Apparatus is utilized for applying the optical effects in piezoelectric and electro-optic materials to optical scanners and logic devices.

Light valves and lasers are finding an increased use in industry. Particularly in display systems and in logic devices are these devices finding increased use. See EDN, Volume 11, No. 4, April 1966, pages 113 through 146. In utilizing light valves and lasers for scanning purposes in display and memory systems and for logic devices, in general, a deflection of the light beam must occur. Light beams can be deflected by mechanical, electro-mechanical, or electro-acoustical, or electro-optical means. Mechanical deflection can be accomplished with rotating or vibrating mirrors or prisms; however, this is an inherently slow method and cannot provide the desired speed of deflection to an arbitrary position on a screen. Mechanical deflection is suitable for a periodic scanning arrangement and is at most capable of producing a televisionlike raster. See EDN, cited above, FIG. 15, page 138.

Electro-optic and electro-acoustical devices which utilize transverse and longitudinal electro-optic effects offer a more promising method of light beam deflection. They are capable of high deflection rates, high resolution, afford immediate access to any display or memory position, and can be built out of rugged, solid-state components. The electro-optic prism is the simplest form of an analog light deflector. If an electric potential is applied to electrodes on the triangular sides of the prism, the index of refraction changes. Since the deflection of the light beam is proportional to the prisms index of refraction, the electric field produced by the applied potential causes the beam to change direction while passing through the prism. See EDN, cited above, FIG. 16, page 139. It is obvious that to achieve both vertical and horizontal deflection, two electro-optic prisms must be oriented at right angles to one another. This is one type of a prior art analog light beam deflection system. Large deflection angles can be achieved with this system by stacking the prisms. However, this causes the disadvantage of beam loss at the prism surfaces.

For many applications, random access digital light deflection is useful. In contrast to continuously positionable analog deflection systems, digital light deflectors position a beam to any one of a discrete array of positions. Presently known digital light deflection systems require a complex array of optical modulators and crystals with unwanted noise and poor efficiency. See Nelson, Bell System Tech. Journal, Volume XLIII, No. 3, May 1964, pages 821 through 845.

The present invention provides simplified optical scanners of both the analog and digital type as well as logic devices such as AND gates which are of low cost and operate at high speeds with low power requirements. The present invention utilizes an optical medium with a light ray, for example a laser beam, applied thereto at some angle of incidence. The light ray may be polarized or nonpolarized depending upon the optical characteristics of the particular optical medium being used according to well known crystalographic principles. As the angle of incidence of the light ray increases, an angle will eventually be reached where total internal reflection will occur along the surface of the medium and no light will pass through to the adjacent medium which could be air. This angle depends upon the index of refraction of the particular optical medium utilized. If, at this angle, means are provided for causing a slight decrease in the index of refraction in the medium, the condition of total reflection will be destroyed and the light will pass through to the air. This effect can be applied to both digital and analog optical scanners and to optical logic devices.

Thus, if the angle of the incident light ray is adjusted until the point of total internal reflection along the surface of the optical medium occurs, either an electric or an acoustic wave front can be caused to propagate through the medium and, at the point where the light ray intersects with the wave front at the surface of the medium, the index of refraction of the medium is changed and light passes through the medium to the air. Thus, as the wave front propagates through the material, the index of refraction of the material in the region of the wave front is changed. Accordingly, the light coincident with the interface and the wave front is refracted and will pass from the material to the air. In effect, the wave front can be considered as a small, transparent diaphragm which transmits a narrow portion of the incident light as it propagates through the material. By means of a lens system, the emerging light ray can be refracted through various angles depending upon the position of the wave fronts. Thus, a single dimension optical scanner is provided.

A two-dimensional scanner can be constructed with the critical angle of the incident light ray adjusted such that a single wave front will not change the initial condition of total internal reflection. The change in the index of refraction at the intersection of two orthogonal wave fronts, however, would be sufficient to cause a change in the refraction of the light so as to allow it to pass through the medium to the air. Since the position the light transmission from the medium depends on the relative phasing of the two orthogonal wave fronts, the device could be used to generate a raster for optical displays and as a readout device for scanning optical memories.

Further, low speed digital logic is often performed with electro-mechanical devices. These devices need significant improvements in cost and reliability to bring them to a level that is comparable to solid-state logic products. The present invention also provides a means of implementing logic circuits at reduced cost with solid-state reliability. An optical AND gate may easily be constructed with the present device with wave fronts produced by orthogonal transducers propagating through the medium to enable the refracted light beam only at the point of coincidence of the wave fronts. DC response can be achieved by physically clamping the crystal.

Thus, the present invention reduces or eliminates mechanical complexities, improves optical efficiency and extends the mean time between failures while improving the maintainability aspects of the equipment.

These and other more detailed and specific objects will be disclosed in the course of the following specification, reference being made to the accompanying drawings, in which.

Figure 7:
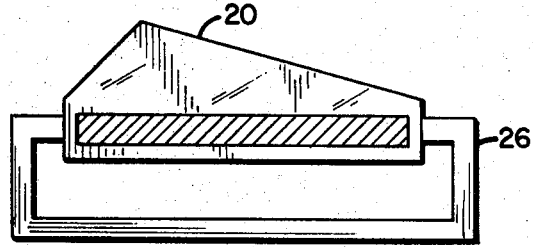

FIG. 7 discloses a DC gate formed by physically clamping an optical medium used in the present invention.

Figure 1A:
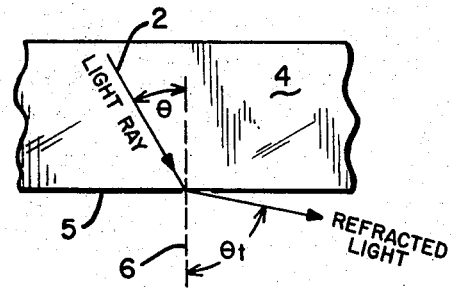
FIGS. 1a and 1b show how the angle of incidence of a light ray upon an optical medium can be increased until total internal reflection occurs.
Figure 1B:
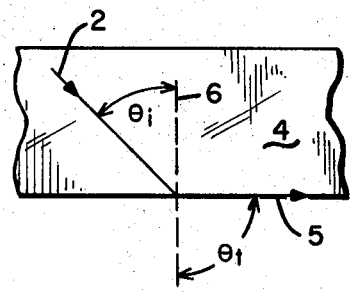

Consider FIG. 1a which shows a light ray 2 which may be in the form of a laser beam obliquely passing through a medium 4 which has an index of refraction greater than 1 with respect to air which has an index of refraction of 1. The light ray will bend away from the perpendicular 6 at the interface by the angle $\theta_t$. As the angle of the incidence, $\theta$, increases, with the angle $\theta$ measured from the perpendicular 6 to the light ray 2, eventually an angle, $\theta_t$, will be reached where total internal reflection will occur along the surface 5 of the medium 4 and no light will pass through to the adjacent medium which could be air. Thus, all rays that can emerge in the air are confined to a cone of angle $\theta < \pi/2$ within medium 4. This angle $\theta$ is called the critical angle. Rays incident on the medium-air surface at an angle greater than $\theta$ have no possible path in the air and are therefore totally reflected. See FIG. 1b. Assuming the light ray to be directed so as to form a critical angle, $\theta_i$, for total reflection, a slight decrease in the index of refraction of the medium 4 will destroy this condition and light will pass through to the air. It can be shown that the greatest change in the angle, $\theta_t$, occurs as total internal reflection is approached. Thus, (1) $\quad \dfrac{\sin \theta}{\sin \theta_t} = \dfrac{n_2}{n_1}$ where $n_1 =$ *the index of refraction for the optical medium and* $n_2$ = the index of refraction for an adjacent medium which, in the case of air, would equal "1"; then (2) $\quad \sin \theta_t = \dfrac{n_1}{n_2} \sin \theta$ and (3) $\quad \theta_t = \sin^{-1}\left[ n_1 \left( \dfrac{\sin \theta}{n_2} \right) \right]$ Calculating $\dfrac{d\theta_t}{dn_1}$, we obtain $\dfrac{d\theta_t}{dn_1} = \dfrac{1}{\sqrt{1 - \left(\dfrac{n_1 \sin \theta}{n_2}\right)^2}} \cdot \dfrac{\sin \theta}{n_2} = \left[\left(\dfrac{n_2}{\sin \theta}\right)^2 - n_1^2\right]^{1/2}$ Now the limit of $\dfrac{d\theta_t}{dn_1}$ as $\theta$ is increased to $\theta_i$ is found by:

(5) $\quad \displaystyle\lim_{\theta \to \theta_i} \dfrac{d\theta_t}{dn_1} = \lim \dfrac{1}{\left[\left(\dfrac{n_2}{\sin \theta}\right)^2 - n_1^2\right]^{1/2}}$ Since, for total internal reflection, $\theta_t = 90°$ and $\sin \theta_t = 1$, the equation (1) reduces to (6) $\quad \dfrac{1}{\sin \theta_i} = \dfrac{n_1}{n_2}$ or $\dfrac{n_2}{\sin \theta_i} = n_1$ and therefore (7) $\quad \left(\dfrac{n_2}{\sin \theta_i}\right)^2 = n_1^2$ Thus, applying the equality in equation (7) to equation (5), it can be seen that the denominator of equation (5) approaches 0 when $\theta$ approaches $\theta_i$ and, therefore, the limit of equation (5) approaches infinity. This, then, indicates that the greatest change in the angle $\theta_t$ occurs as total internal reflection is approached and, therefore, as the angle of incidence, $\theta_i$, is approached.

Figure 2:
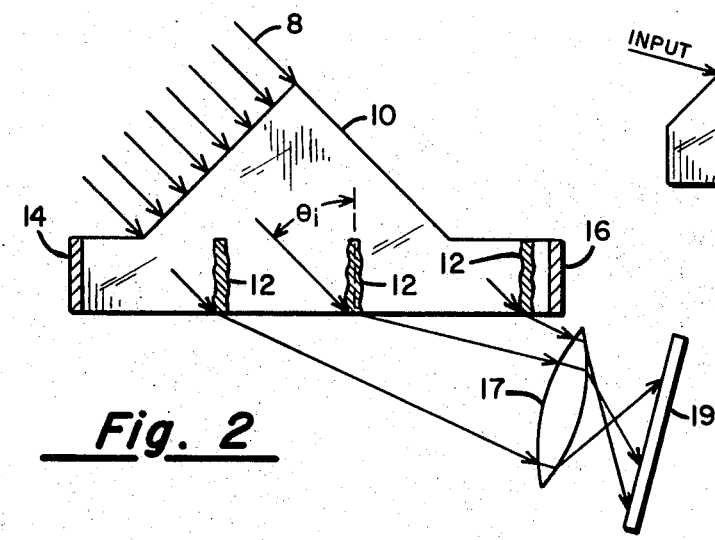
FIG. 2 shows the invention used as a single dimension analog scanner.

In FIG. 2, this effect is shown applied to the simplest type of single dimension analog scanner. This single dimension scanner would consist of a transparent piezo-optic material such as quartz in which a progressive train of wave fronts are propagated from a transducer at one end to an absorber at the other end. Thus, an incident sheet of light 8 produced by a suitable optical system would pass through the piezo-optic material 10 at the critical angle $\theta_i$ so that total internal reflection would occur within the medium. However, as a wave front 12 propagates through the material, the index of refraction of the material in the region of the wave front is changed accordingly, See Lepnick et al., "Nonmechanical Scanning of Light in One and Two Dimensions", Proc. IEEE, 53,321, 1965. The light coincident with the interface and wave front is refracted and, in this case, will pass from the material 10 to the air. In effect, the wave front can be considered as a small transparent diaphragm which transmits a narrow fraction of the sheet of light as the wave front propagates through the material. By means of a lens system 17, the emerging light ray can be refracted through various angles depending on the position of the wave fronts. This allows various sizes of mediums 19 to be scanned to be utilized with the system. Thus, scanning in one dimension is produced. Wave fronts 12 are produced by transducer 14 which converts electrical energy to mechanical or acoustical wave fronts. Absorber 16 stops reflections of the wave fronts 12. However, to reduce power requirements, the sound absorber 16 in FIG. 2 could be eliminated so that the wave fronts 12 would be reflected in phase. Upon returning to transducer 14, they would be reinforced by subsequent pulses from transducer 14.

Instead of using acoustical wave fronts as produced by transducer 14 in FIG. 2, an electro-optic material such as KTN, Potassium Tantalum Niobate, or LiNbO₃, Lithium Niobate, may be used wherein electric field wave fronts are produced by transducers 14. These electric field wave fronts again create a change in the refractive index of the material 10 in the region of the wave front. The light is then refracted and passes to the air.

Figure 3:
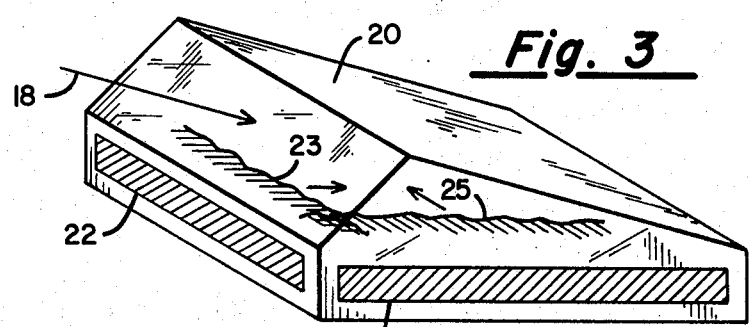
FIG. 3 shows a two dimensional analog scanner embodying the present invention.

A two dimensional scanner can be constructed using the configuration shown in FIG. 3. In this embodiment, light ray 18 enters medium 20 at the critical angle $\theta_i$. Piezoelectric transducer 22 produces a first wave front 23 when pulsed while piezoelectric transducer 24 produces a second wave front 25 when pulsed. Neither the first nor the second wave front alone would change the initial condition of total internal reflection. The index of refraction change at the region of intersection of both the first and second wave fronts, however, would be sufficient to cause the refracted light to pass through the medium. Since the position of light transmission depends upon the relative phasing of the first and second wave fronts 23 and 25 respectively, the device would be used to generate a raster for optical displays or as a readout device for scanning optical memories. It will also be noted that the first and second wave fronts may be applied in phase or out of phase if a change in the direction of the raster is desired. Light ray 18 may be pulsed and thus adjusted in phase with the first and second wave fronts in order to scan a discrete area of the medium such as a storage memory.

Figure 4:
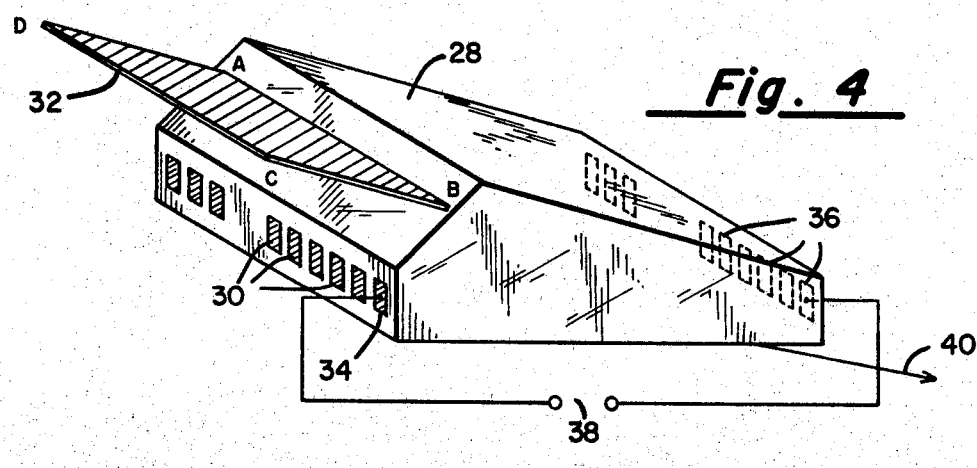
FIG. 4 shows a digital scanner embodying the present invention.

The bar-shaped optical medium 28 shown in FIG. 4 would operate as a digital scanner. The transparent electro-optic bar is segmented by pairs of electrodes 30. The incident light 32 shown in plane ABCD would constitute the input and the position of the output beam with respect to the bar would depend upon which segment was enabled, i.e., which set of electrodes was being activated by a gate pulse. Thus, if segments 34 and 36 were activated by a gate pulse on terminals 38, an output would appear in the direction of arrow 40. Thus, any one or more of the segments can be enabled simultaneously to obtain a digital output.

If only one pair of the electrodes shown in FIG. 4 are used, and a varying electric voltage is applied thereto on terminals 38, for instance, a varying field will be produced in said medium whereby a light modulator will be produced.

Figure 5:
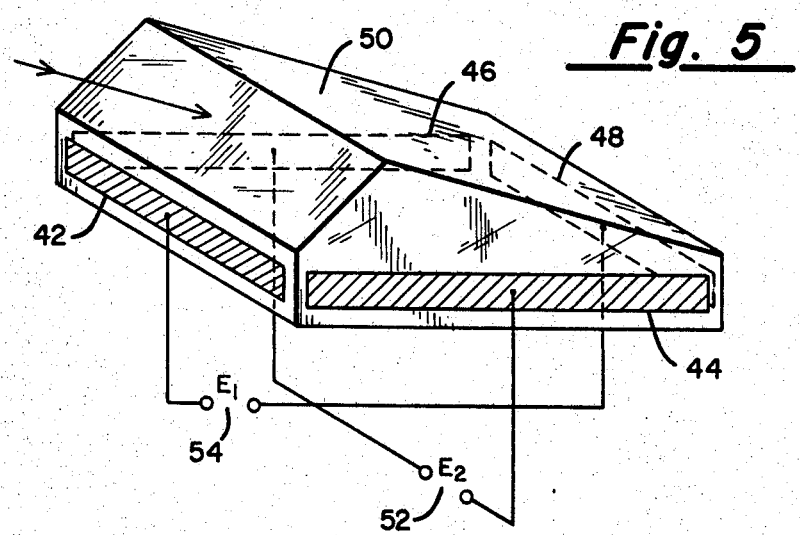
FIG. 5 shows a logical AND gate constructed with the inventive concept.

The device shown in FIG. 5 performs logically as an AND gate. In this embodiment, two piezoelectric transducers 42 and 44 (or four electrodes 42, 44, 46 and 48 if an electro-optic material is used) are oriented with respect to optical medium 50 and electrically connected as shown such that when a voltage is applied to the plates in phase the resultant wave fronts propagating through the medium will refract the light beam at the point of coincidence and cause an output to be produced. Thus, it requires both a first source of voltage applied to terminals 52 and a second source of voltage applied to terminals 54 in order to produce a light output and, therefore, the device performs logically as an AND gate.

Figure 6:
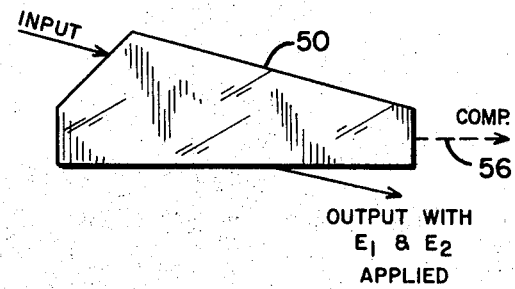
FIG. 6 shows a logical NAND gate embodying the invention concepts.

A NAND gate may be constructed as shown in FIG. 6. With no absorber, the light ray will exit from the medium 50 in the direction of arrow 56 when both sources of voltage are not applied to the transducers. This, then, is the complement output. With both sources of voltage applied to the transducers, the light is refracted and exits as shown by arrow 57.

If the optic medium in FIG. 2 is physically clamped such as shown by clamp 26 in FIG. 7, the device becomes a DC gate. It is no longer a scanner but will continuously pass light that is applied thereto. The device of FIG. 5 is also a DC gate as long as the excitation is applied to the transducers.

It is understood that suitable modifications may be made in the structure as disclosed provided such modifications come within the spirit and scope of the appended claims.

I claim:
1. A device for deflecting a beam of electromagnetic radiation, comprising:
   a. a piezo-optic medium having an index of refraction;
   b. a beam of electromagnetic radiation impinging upon said medium at the critical angle of incidence whereby said index of refraction causes total internal reflection;
   c. a first piezoelectric transducer coupled to said medium for producing a first wave front insufficient to change the initial condition of total internal reflection; and
   d. a second piezoelectric transducer coupled to said medium for producing a second wave front at right angles to said first wave front and to said beam of radiation and insufficient of itself to change the initial condition of total internal reflection, the arrangement being such that the change of the index of refraction at the intersection of said first and second wave fronts is sufficient to cause the refracted beam to pass through said piezo-optic medium thereby producing a two-dimensional scanner.
2. A device for deflecting a beam of electromagnetic radiation, comprising:
   a. an electro-optical material having an index of refraction;
   b. a beam of electro-magnetic radiation impinging upon said material at the critical angle of incidence whereby said index of refraction causes total internal reflection;
   c. a first pair of electrodes coupled to said material for producing a first field parallel to the horizontal component of said beam of incident radiation which is insufficient by itself to change the initial condition of total internal reflection; and
   d. a second pair of electrodes coupled to said material for producing a second field normal to the horizontal component of said beam of incident radiation which is insufficient by itself to change the initial condition of total internal reflection, the arrangement being such that the change of the index of refraction when said fields are simultaneously applied to said material is sufficient to cause an emergent refractive beam.